No. 838,161. PATENTED DEC. 11, 1906.
H. E. BARNES.
POULTRY FEEDER AND EXERCISER.
APPLICATION FILED AUG. 20, 1906.

WITNESSES:

INVENTOR
H. E. Barnes,
By Franklin H. Hough
Attorney

UNITED STATES PATENT OFFICE.

HARVEY E. BARNES, OF BRINKHAVEN, OHIO.

POULTRY FEEDER AND EXERCISER.

No. 838,161.  Specification of Letters Patent.  Patented Dec. 11, 1906.

Application filed August 20, 1906. Serial No. 331,395.

*To all whom it may concern:*

Be it known that I, HARVEY E. BARNES, a citizen of the United States, residing at Brinkhaven, in the county of Knox and State of Ohio, have invented certain new and useful Improvements in Poultry Feeders and Exercisers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in poultry feeders and exercisers, and comprises means whereby poultry may cause feed to be fed from a hopper by the manipulation of a tilting rod adapted to actuate a stirrer mounted within the grain-hopper, whereby the grain may be automatically fed and allowed to fall by gravity from the hopper.

My invention comprises various details of construction and combinations and arrangements of parts, which will be hereinafter fully described, and then specifically defined in the appended claims.

I illustrate my invention in the accompanying drawings, which, with the letters of reference marked thereon, form a part of this application, and in which—

Figure 1:
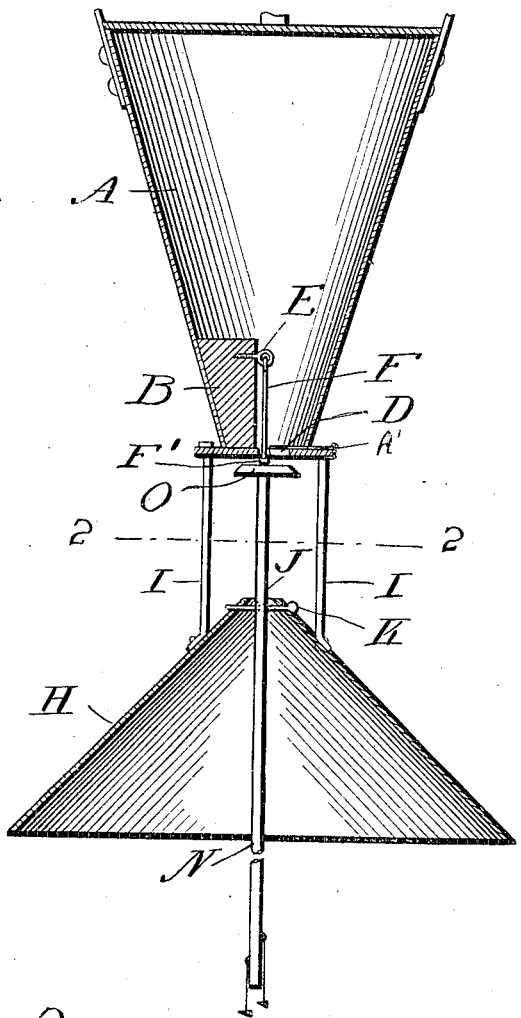
Figure 2:
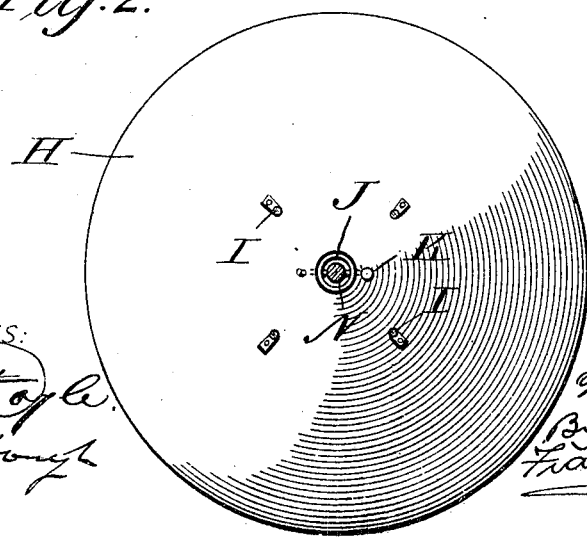

Figure 1 is a vertical sectional view through my improved poultry feeder and exerciser, and Fig. 2 is a sectional view taken on line 2 2 of Fig. 1.

Reference now being had to the details of the drawings by letter, A designates a grain-hopper, which may be fastened to any support, as may be desired, and B is a block projecting from the inner wall of the hopper near its lower end.

C designates an exit-aperture, which is regulated by a slide D, whereby the amount of feed being fed may be regulated. E designates a screw-eye fastened to said block, and F is a rod having a hook at its upper end connected to said eye and extends through the exit-opening of the hopper and is provided with a head F', extending below the hopper.

H is a conical-shaped hood suspended by means of the rods I, which pass through apertures in the flange A' about the lower end of the hopper. The upper end of said hood has an aperture J, and a pivot-pin K passes through the upper end of the hood adjacent to said aperture. N designates a rod pivotally mounted upon said pivot-pin and has a disk O at its upper end. Said rod N is so mounted that it will have a swinging movement, whereby the disk O may contact with the head of the rod F and cause the same to be agitated and prevent feed clogging the exit-aperture of the hopper. The lower end of the rod N, which latter extends a considerable distance below the lower edge of the hood, has a bait fastened thereto, which consists, preferably, of kernels of corn fastened to a string or wire and secured to said rod and adapted to attract the eye of the fowl.

If preferred, brass-headed tacks or other devices resembling kernels of corn may be substituted for the latter after the fowls have acquired the habit of coming to my improved apparatus for feed.

The operation of my invention is simple and is as follows: The hopper being suspended at any suitable location and the bait attached to the rod N will attract the eye of a fowl, and as the latter reaches up to pluck the bait will cause the rod N to tilt, and the disk O at the upper end thereof, coming in contact with the head F', will cause the latter to tilt and agitate the feed about the exit-opening in the hopper, allowing the same to fall through said opening and be scattered by the food coming in contact with the upper surface of the conical hood. It will thus be seen that the food as it falls will be distributed over a considerable area of ground or floor underneath the apparatus, thus allowing a number of fowls to share the food.

What I claim is—

1. A poultry feeder and exerciser comprising a hopper, an agitator pivotally mounted therein and extending through an exit-opening in the bottom thereof, a hood suspended from the hopper and provided with an opening at its apex, a pivot-pin carried by the hood, a rod extending through the opening at the apex of said hood, and a disk at the upper end of said rod adapted to tilt said agitator, as set forth.

2. A poultry feeder and exerciser comprising a hopper, a block mounted therein, a screw-eye fixed to said block, an agitator pivotally connected to said screw-eye and extending through an exit-opening in the hopper, a hood supported by the hopper, a pivotal rod extending through an aperture in said hood, and a disk at the end of said rod adapted to tilt said agitator, as set forth.

3. A poultry feeder and exerciser comprising a hopper having a flange projecting from its lower end, an agitator pivotally mounted within the hopper and extending through an exit-opening therein, a hood, rods carried by said flange and engaging said hood, a pivotal pin passing through said hood adjacent to the aperture in the apex thereof, a rod mounted upon said pin and having a swinging movement, and a disk fixed to the upper end of said rod and adapted to tilt said agitator, as set forth.

In testimony whereof I hereunto affix my signature in the presence of two witnesses.

HARVEY E. BARNES.

Witnesses:
C. S. STARUER,
OSBORN WORKMAN.